United States Patent [19]
Hallberg

[11] 3,822,896
[45] July 9, 1974

[54] AUTOMATICALLY RELEASABLE SAFETY DEVICE FOR VEHICLES

[76] Inventor: Gert Benny Hallberg, Estlandsgatan 3A, S-214 31 Malmo, Sweden

[22] Filed: Jan. 12, 1973

[21] Appl. No.: 323,097

[30] Foreign Application Priority Data
Sept. 19, 1972  Sweden............................ 12075/72
Oct. 2, 1972  Sweden............................ 12696/72

[52] U.S. Cl........ 280/150 AB, 280/150 SB, 297/388
[51] Int. Cl............................................ B60r 21/10
[58] Field of Search.... 280/150 AB, 150 B, 150 SB; 296/84 K; 297/388

[56] References Cited
UNITED STATES PATENTS

| | | | |
|---|---|---|---|
| 2,781,203 | 2/1957 | Kurilenko.................... | 280/150 AB |
| 3,146,460 | 9/1964 | Henderson.................... | 280/150 SB |
| 3,441,103 | 4/1969 | Lymar....................... | 280/150 AB X |
| 3,545,789 | 12/1970 | Graham........................ | 280/150 B |
| 3,618,978 | 11/1971 | Klove.......................... | 280/150 AB |
| 3,682,498 | 8/1972 | Rutzki........................ | 280/150 AB |
| 3,687,485 | 8/1972 | Campbell...................... | 280/150 B |
| 3,715,130 | 2/1973 | Harada et al................. | 280/150 AB |

*Primary Examiner*—Kenneth H. Betts

[57] ABSTRACT

At violent retardation, acceleration, compressing or twisting of a vehicle a transversely extending, gastight envelope by means of a first pressurized gas source is thrown backwards from a front position towards the body of the passenger so as to roll upwards over the body into a rear position, said hose during said backwards movement by means of a second pressurized gas source being inflated into a pad-like envelope of substantially larger volume catching the body and firmly securing the passenger to the seat.

25 Claims, 7 Drawing Figures

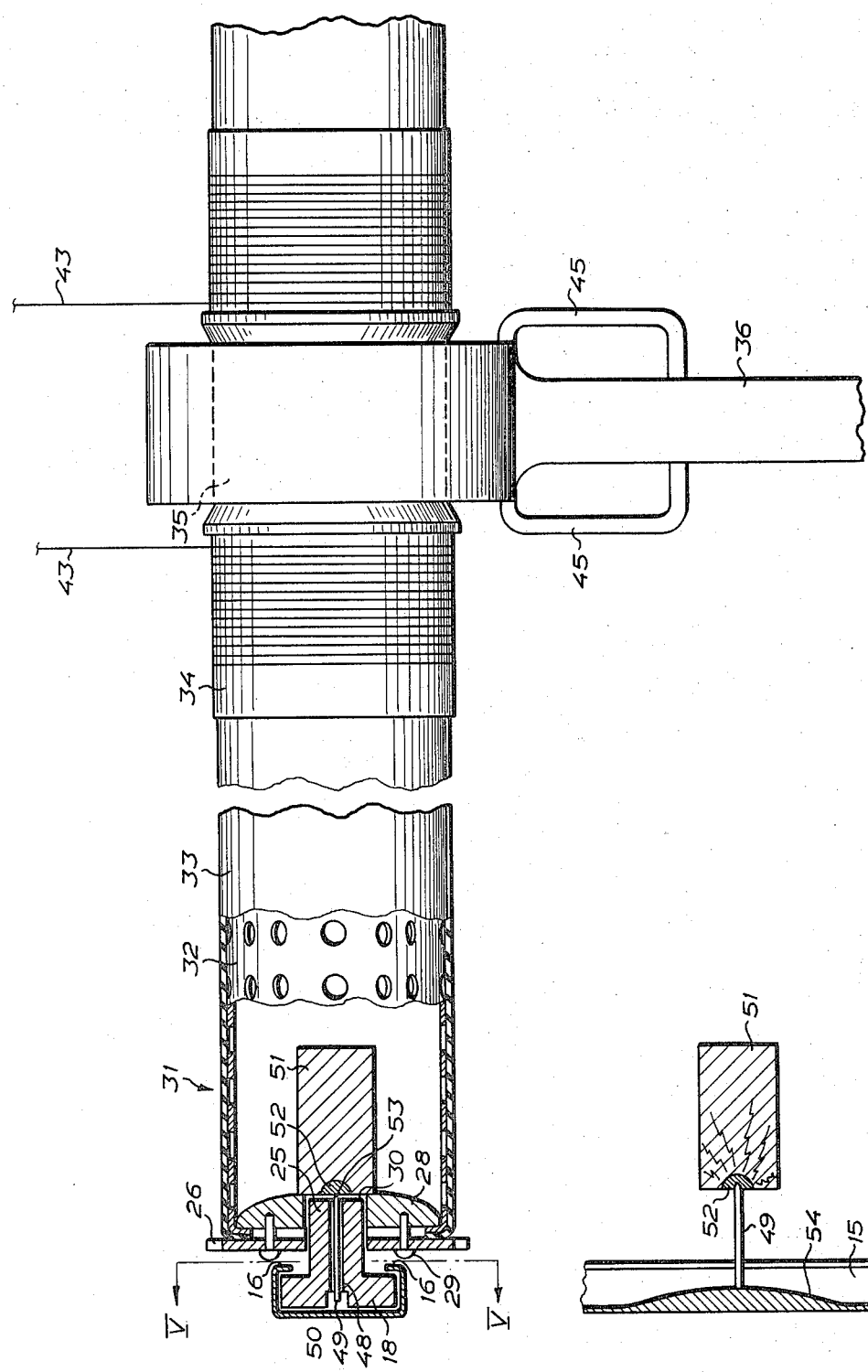

AUTOMATICALLY RELEASABLE SAFETY DEVICE FOR VEHICLES

BACKGROUND OF THE INVENTION

This invention relates to an automatically releasable safety device for vehicles, such as cars, motor couches, airplanes, and other means of transportation of passengers in order to protect the driver and his co-passengers both in the front seat and in the back seat.

Device for this purpose are previously known which consist of folded pads or envelopes which by means of a pressurized gas source in the event of a collision are automatically inflated in front of the passenger in order to catch his body and prevent him at the collision from abutting parts of the car being in front of him, such as the steering wheel or the windshield. The known devices of this type, however, suffer from serious drawbacks in that they, due to the large volume of released gas, may give rise to serious individual and material injuries and damages, and in the inflated form they are very bulky and block the view of the driver of the car and limit his ability, if possibly, to again get control of the car after the collision.

These disadvantages have been eliminated by the present invention by means of which the passenger, independent of small variations of his sitting posture, will be firmly retained on his seat and thus protected against serious body injuries, and the driver of the car also after the collision and the inflation of the envelope will have a free view and thus a certain possibility to operate the car.

BRIEF SUMMARY OF THE INVENTION

The automatically releasable safety device for vehicles comprises at least one first pressurized gas source, a member for activating said first pressurized gas source, means to activate said member at violent acceleration, retardation, compressing or twisting of said vehicle, an elongated gas-tight envelope transversely extending under an instrument board in said vehicle, means to set said envelope in a controlled backward movement at the activation of said first pressurized gas source, from a front position under said instrument board and rolling over the body of a passenger in said vehicle into a rear position, a second pressurized gas source, means to activate said second pressurized gas source after said envelope has been moved backwards past the steering wheel of said vehicle, and means to inflate said envelope into a pad of substantially larger volume over the body of the passenger to firmly secure the body to the seat.

BRIEF DESCRIPTION OF THE SEVERAL VIEWS OF THE DRAWING

FIG. 3 is a fragmentary side elevation view, partly in longitudinal section, of the inflatable hose.

FIGS. 4 and 5 illustrate, on an enlarged scale, details of the invention, FIG. 5 being a section on line V — V in FIG. 3.

DETAILED DESCRIPTION

Figure 2:
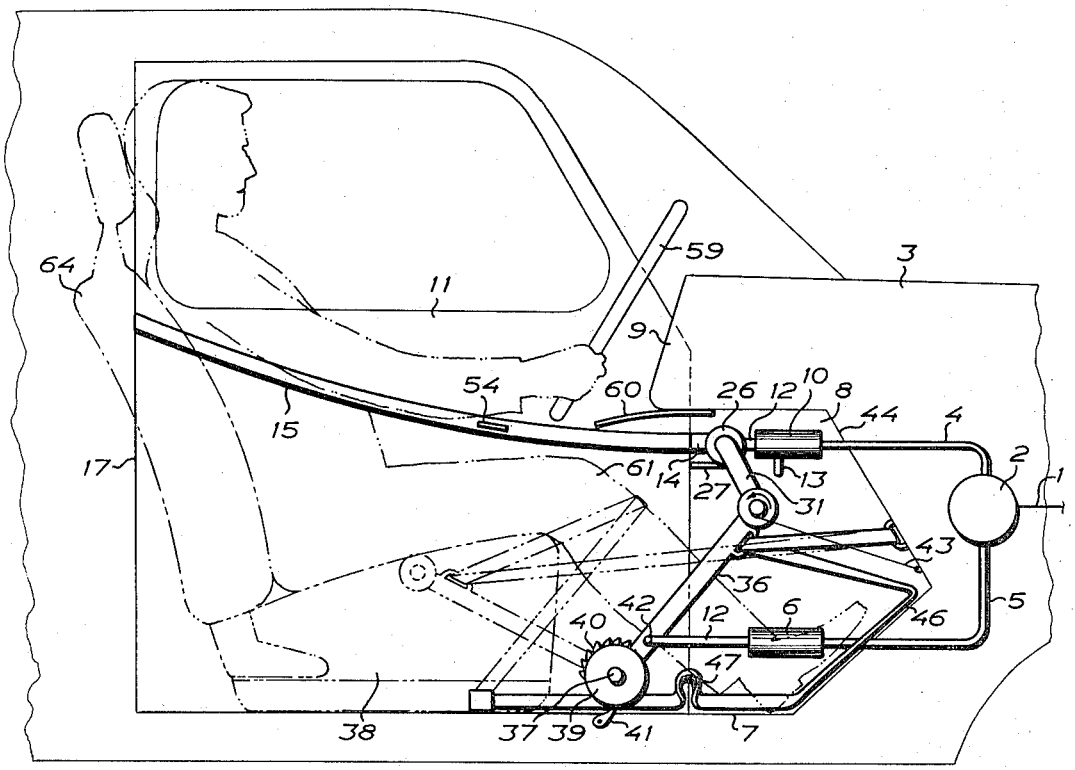
FIG. 2 is a sectional side view on the line II—II in FIG. 1 of the same portion of the car, however with the safety device unreleased.

In FIG. 2 reference numeral 1 indicates a conventional preferably electrical or mechanical operating member by means of which a pressurized gas source 2 in the rear portion of the engine hood 3 of the car is activated by one or more release apparatus (not shown) mounted at spaced points of the car, in case of exceptionally violent acceleration, retardation, compressing or twisting of the car. The pressurized gas source 2 may be a charge of powder, a compressed-air tube, a carbonic acid tube or the like. Through conduits 4 and 5 the generated pressure wave simultaneously passes to horizontal pressure cylinders, a first cylinder 6 being mounted slightly above the floor 7 of the car and approximately along the longitudinal centre line thereof in the space 8 under the instrument board 9, and a second cylinder 10 being mounted on one or both of the side walls of the car ahead of the respective door 11. Each cylinder 6, 10 is provided with a piston and a piston rod 12 extending from the rear end of the respective cylinder, and a gas exhaust 13 having a reducing valve, for instance in the form of a constriction of the exhaust pipe.

Mounted on the inside of each of the side walls and the door 11 of the car are two rail sections 14 and 15, respectively, having U-profile with edge flanges 16 extending towards each other (FIG. 3), said rail sections in the closed position of the door being exactly aligned with each other to form a continuous guide track which in gentle arc shape extends from a point under the instrument board 9 to the rear edge 17 of the door 11 (FIG. 2). Into the rail section 14 of the side wall is inserted a carriage movable along the track and consisting of an elongated, parallel epipedic body 18 which by means of a front end block 19 is easily slidable behind the edge flanges 16. The block 19 generally is positioned opposite the end of the piston rod 12 in the respective side cylinder 10. The rear portion of the carriage 18 is provided with an upper brake pad 20 and a lower brake pad 21, said brake pads being slidably mounted behind the edge flanges 16 and pivotally connected with the carriage 18 by means of link members 22 extending obliquely upwards and downwards. Between the brake pads 20, 21 a compression spring 23 is mounted which extends through an opening 24 in the carriage 18 and urges apart the brake pads against the top and bottom sides of the track. The rail section 15 is open at the rear end.

On the side facing the interior of the car the carriage 18 is provided with a cylindrical pin (FIG. 3) extending between the flanges 16. On the pin 25 is pivoted a gear wheel 26 which engages a rack 27 mounted on the side wall of the car under the rail section 14 in parallel therewith. To that side of the gear wheel 26 facing the interior of the car is by means of screws 29 secured a circular disk 28. The disk 28 is provided with a central opening 30 in which the end of the pin 25 is received. The profile of the disk side facing the interior of the car is convex and has a rounded peripheral rim (FIG. 3).

Between the gear wheel 26 and the circular disk 28 one of the ends of a hose generally indicated by the reference numeral 31 is gas-tightly clamped. The hose 31 comprises an inner part 32 which is perforated in its full length and made of a torsion resistive material, and an outer hose 33 made of a material having good tensile strength in the longitudinal direction thereof and preferably provided with an inner layer of gas-tight, extensible, resilient material, such as rubber or plastic, and an outer cloth layer providing a good form fit around the body of the passenger. In the idle state of the safety device said two hoses 32, 33 are connected with each other by means of a suitable binding agent.

The central portion of the hose 31 being situated approximatively adjacent the longitudinal middle plane of the car, is passed through a sleeve 34 pivoted in an opening 35 in the top end of a lever 36. At the bottom end the lever 36 is pivoted on a horizontal shaft 37 about which the lever may be moved approximately in the longitudinal middle plan of the car from a front position indicated by full lines in FIG. 2 into a rear position indicated by dot-and-dash lines in FIG. 2, the lever in said rear position engaging the space between the seating pads 38 of the car. The shaft 37 should be mounted at such a height level that the topmost point of the arcuate path of movement of the top end of the lever 36 will be above the knees of the passenger. The bottom end of the lever 36 mounted on the shaft 37 is shaped as a circular disk 39 which over a part of its periphery is provided with a ratchet tooth segment 40 which, as will be more exactly described below, cooperates with the ratchet pawl 41 mounted on the floor of the car to automatically lock the lever 36 in the rear position thereof. The piston rod of the cylinder 6 at its rear end by means of a pin 42 is linked to the lever 36 adjacent the circular disk 39.

On either side of the lever 36 a wire 43 is wound about the sleeve 34 and secured thereto with one of its ends, the opposite end thereof being secured to the front wall 44 of the space 8 under the instrument board 9.

Instead of a single hose for the passengers in the front seats also separate hoses communicating with each other may be used.

The lever 36 further is provided with two ears 45 for one belt 46 each, the one end of which is secured to the inside of the respective door 11 from which the belt extends to the wall 44 and is attached thereto by means of sewing-thread. From there the belt is passing through the respective ear 45 and back to the wall 44 to which is secured the opposite end of the belt. At the front edge of the door 11 the belt is formed into a loose loop 47 of such a size that the belt does not obstruct the movement of the door.

As appears from FIG. 3, the pin 25 is provided with a central bore 48, in which a needle-like pin 49 is movable in axial direction. One end of the pin 49 extends into a longitudinally extending channel 50 in the opposite side of the carriage 18 in relation to the pin 25, and the opposite end of the pin 49 projects from the bore 48. To the side of the circular disk 28 facing the interior of the car and within the inner hose 32 is secured a pressurized gas tube 51 having a detonator means 52 aligned with the pin 49 and the adjacent sharp point 53 thereof. On the inner wall of the rail section approximately in a vertical transverse plan immediately behind the rear edge of the steering wheel 59 and opposite the channel 50 in the carriage 18 is provided an elongated cam-shaped projection 54 extending in the longitudinal direction of the rail section 15 (FIG. 4).

Figure 5:
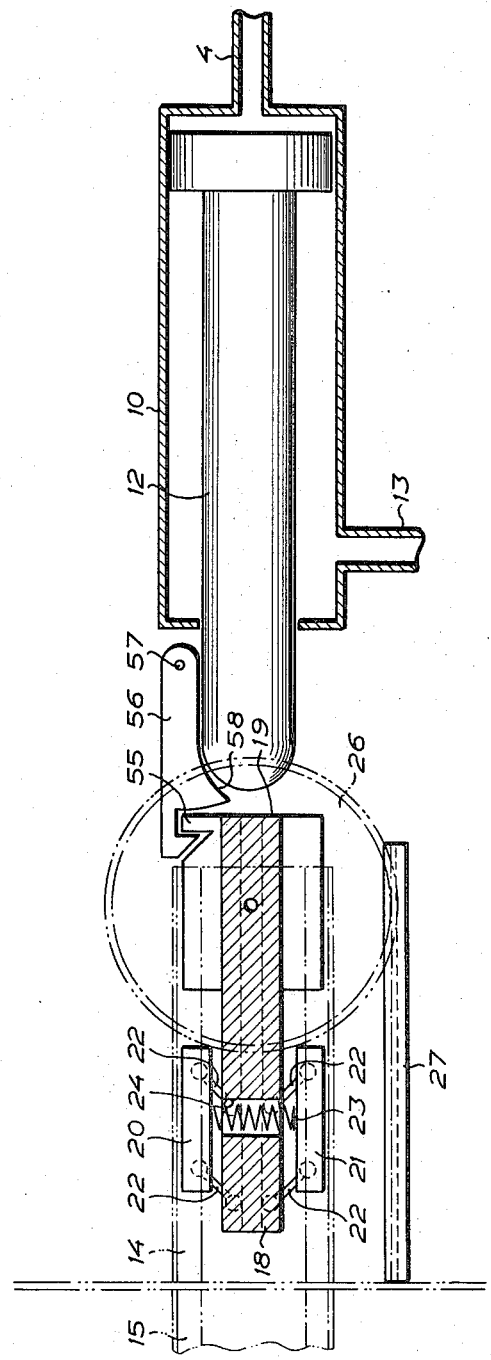

In order to prevent the carriage 18 otherwise than by means of the associated pressure cylinder 10 from being moved along the track and inadvertently initiating the detonator means 52 by operation of the pin 49, the carriage 18 at its front end is provided with a lock hook 55 (FIG. 5) which engages with a lock pawl 56 pivotally mounted on a horizontal pin 57 on the side wall of the car. The lock pawl 56 on the underside is provided with a cam surface 58 extending into the path of movement of the piston rod 12 of the associated cylinder 10.

Adjacent the steering wheel 59 a slightly downwards curved plate 60 extends backwards from the lower edge of the instrument board 9 in order to guide the hose past the lower rear portion of the steering wheel without contact therewith at the backward movement of the hose.

In certain car types it is suitable to provide a stop means for the knees of the passengers behind and below the hose 31 in order to prevent the knees from obstructing the path of movement of the hose in the event of a collision.

Figure 1:
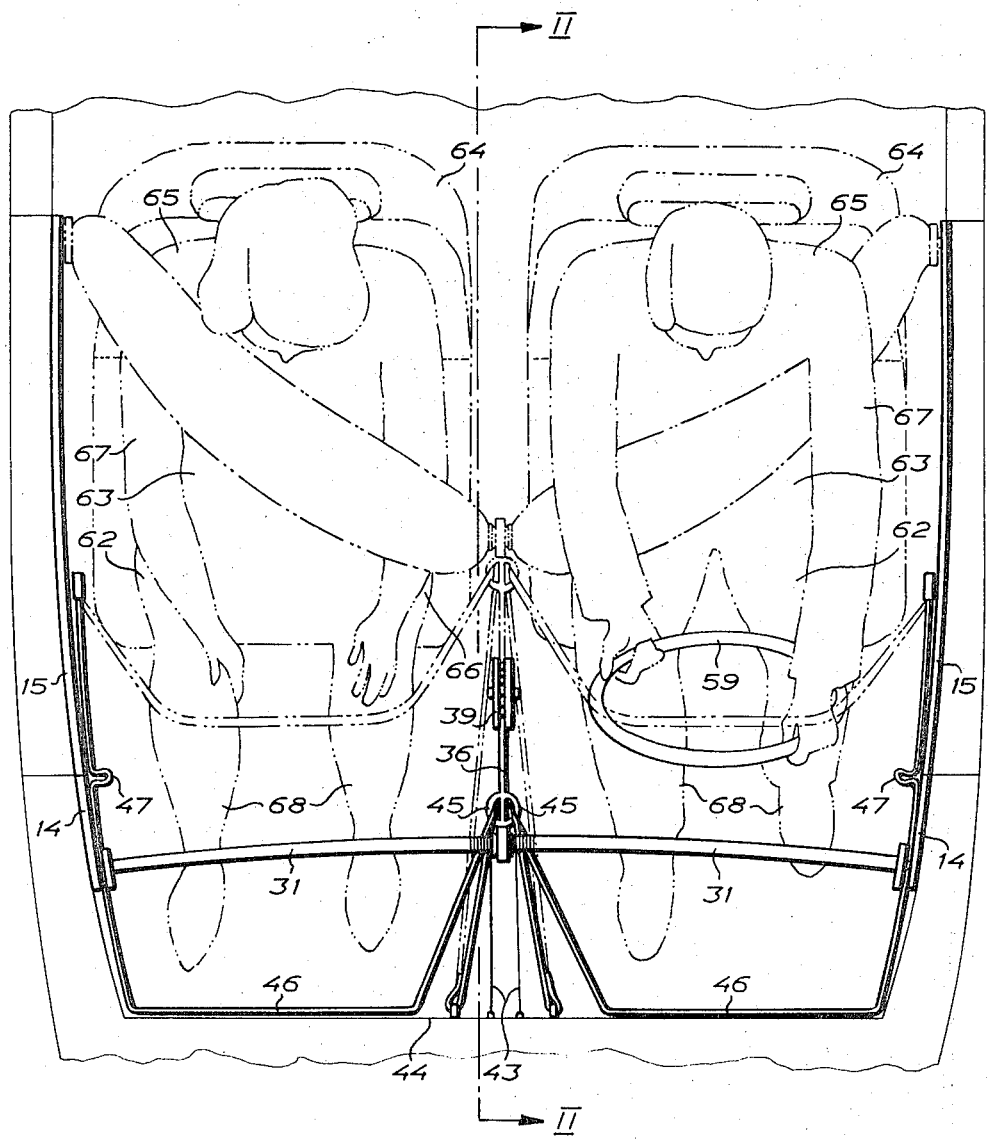
FIG. 1 diagrammatically shows the front seat portion of an auto car in top plan view and with a safety device according to the invention, released.

In operation, the hose 31 in the idle position of the system extends under the instrument board between the two side walls of the car and the lever 36, the latter occupying the front position indicated by full lines in FIG. 1.

At a collision, or whenever the acceleration or retardation of the car exceeds a predetermined value, the pressurized gas source 2 in conventional way is activated by the release apparatus (not shown) by means of the operating member 1. The pressurized gas simultaneously is admitted into the three cylinders 6 and 10, respectively, and the piston rods 12 are extended. The piston rod 12 of each of the side cylinders 10 initially abuts the cam surface 58 of the pawl 56 which is pivoted upwards and disengaged from the lock hook 55 of the carriage 18 whereupon the piston rod abut the surface of the block 19 at the front end of the respective carriage 18 so that the carriage is thrown backwards along the track passing from the track section 14 onto the track section 15. At the same time the lever 36 by the piston rod 12 of the cylinder 16 is thrown backwards and pivoted about the shaft 37. As a result of said simultaneous movements of the two carriages 18 at the sides of the car and of the lever 36 in the middle area thereof also the hose 31 is thrown backwards towards the passenger (or passengers) in the front seat and abuts the legs immediately under the knees 61. Simultaneously with the starting of the backward movement of the hose 31 over the body of the passenger the hose is forcedly subjected to a clock-wise rotation about its longitudinal axis due partly to the fact that the two wires 43 are unwound from the sleeve 34 and partly to the fact that the gear wheels 26 are rolling along the racks 27. While rolling upwards over the knees 61 the hose 31 is guided by the plate 60 so that it does not contact the instrument board 9 or the steering wheel 59. The hose 31 then is rolling upwards over the thighs 62 of the passenger and catches the trunk 63 which now has started its movement in forward direction due to the collision.

When the lever 36 is pivoted backwards the sewing-thread connection between the lower belt 46 and the wall 44 is torn off and the belt 46 is thrown backwards while sliding through the ear 45 and is tightly applied to the lower legs 68 of the passenger thus preventing his body from being forced down from the seat and preventing his legs from being squeezed against the front wall 44.

Immediately after the hose 31 has been moved past the steering wheel 59 the pin 49 is activated by the stationary cam 54 extending into the channel 50 of the carriage 18 so that the pin 49 is axially displaced to abut the detonator 52 which initiates the pressurized gas tube 51. The pressurized gas thus released flows through the perforations of the inner hose 32 and disconnects the outer hose 33 therefrom and inflates the same into the shape indicated in FIG. 2 while the hose continues to move backwards together with the carriages 18 and the lever 36 and also continues to roll upwards over the body of the passenger at which the hose is more or less twisted about its longitudinal axis. This results in that the body of the passenger by the inflated hose will be firmer and firmer pressed backwards and downwards against the back rest 64 and the seat pad 38 until the body is tightly secured in the car. During the backward movement the lever is pivoted into the space between the two front seats 38 to occupy the position indicated by dot-and-dash lines in FIG. 2, in which position the central portion of the hose 31 (sleeve 34) is positioned between the two seating pads 38 at the same level as the upper surfaces of the pads and approximately at the middle of the sides of the pads. In this position the lever 36 is automatically locked in that the locking pawl 41 engages with the ratchet tooth segment 40. The two carriages 18, however, continue the backward movement until they are in a position in level with and slightly behind the outer shoulder 65 of the respective passenger in which position the carriages are stopped by the tension of the hose 31 at which a reaction forward movement of the carriages (and the hose) is prevented in that the braking pads 20, 21 are urged apart. Thus, in this position the inflated hose is tightly applied to the body of the passenger and extends diagonally from the inner hip 66 to the outer shoulder 65 of the passenger at which the hose may be positioned over or under the shoulder in dependence of the position of the respective arm 67 at the collision moment.

During the backward movement the hose 31 due to the shape of the track sections 14, 15 and the pivoting movement of the lever 36 is forced to follow a path of movement in which the hose cannot contact the steering wheel 59 or other stationary parts of the car but is immediately guided towards the body of the passenger and necessarily must follow the outline of his body while its pressure against the body is successively increased, but on the other hand the pressure is distributed over a larger area of the body as soon as the outer hose 33 has been moved past the steering wheel and inflated by pressurized gas.

When the outer hose 33 is inflated the torsion power will develop a tensioning force by means of which the body is additionally forced backwards. This effect in combination with the tensioning effect developed by the disk 28 due to the kinetic energy thereof acting on the hose 31 will firmly secure the body to the seat.

In this position in which the body is firmly attached by the hose 31 and the belt 46 the driver still will have a free view and can move his arms and therefore he is able to again get control of the car, such as in the event of a skidding of the car following the collision. The secured body may be released in that the lock pawl 41 is pivoted and disengaged from the ratchet tooth segment 40 and the carriage 18 is withdrawn from the rear open end of the track section 15 after the door 11 has been opened. Possibly, these operations may be performed by the passenger himself.

The doors 11 of the car should have completely smooth inside surfaces and, for instance, be provided with retractable handles etc. so that the movement of the hose 31 above described will not be obstructed.

In order that the device according to the invention may be useful also, for instance, to children a vertically adjustable disc having two tracks may be provided in the track section 15, one of said tracks in a first adjustment position of the disk being complementary to said slightly upwards curved main track, and the other track of the disk in a second adjustment position at the front end of the disk being aligned with the main track and at the rear end of the disk being aligned with a slightly downwards curved auxiliary track.

Figure 6:
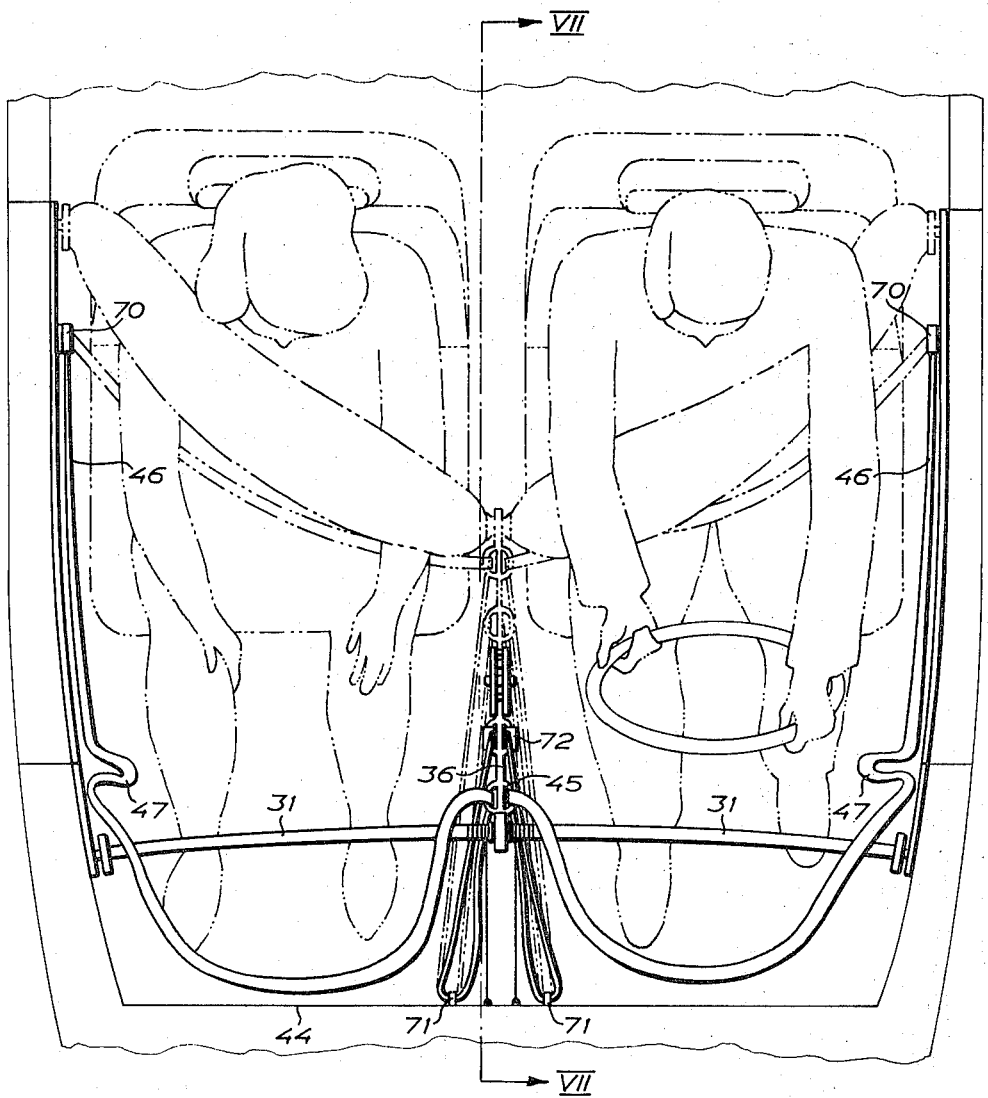
FIG. 6 shows the front seat portion of an auto car in top plan view with a slightly modified embodiment of the safety device, released.
Figure 7:
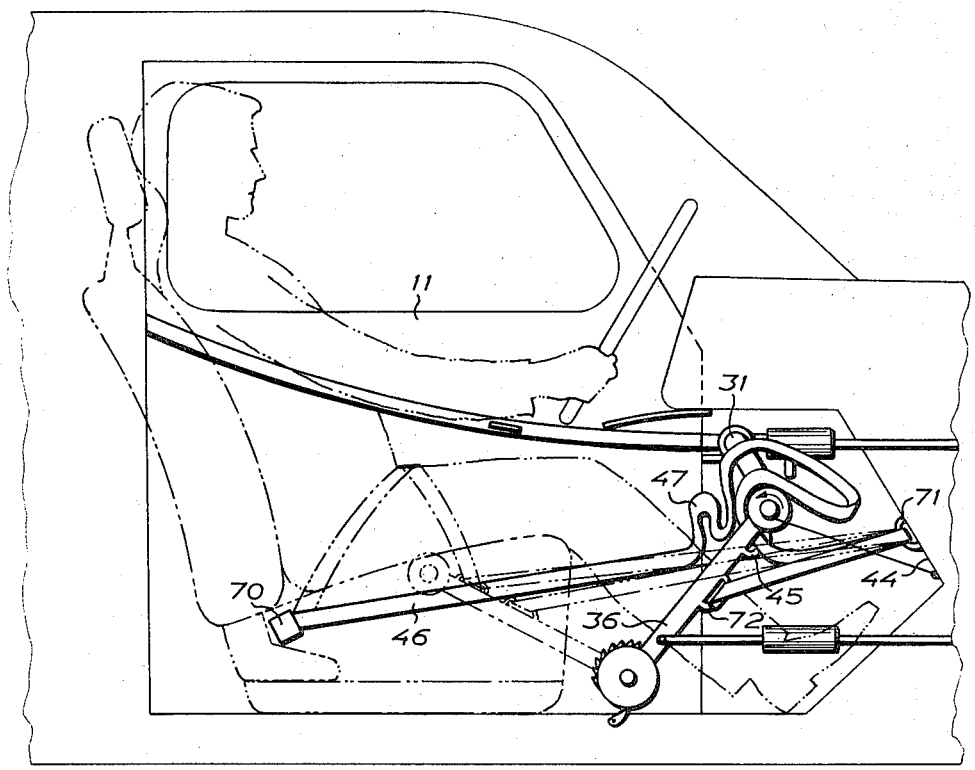
FIG. 7 is a sectional side view on the line VII—VII in FIG. 6, however with the safety device unreleased.

In the modified embodiment according to FIGS. 6 and 7 the belt 46 from an attachment point 70 at a suitable height lever on the inside of the door 11 over a loop portion 47 at the front edge of the door 11 extends to the front wall 44 of the space 8. The portion of belt 46 extending along the front wall 44 is formed into a loop which is from behind suspended by the hose 31 and then extends through the ear 45 of the lever 36. From the ear 45 the belt extends under the hose 31 to the wall 44 and through a guide ear 71 on the wall 44 back to the lever 36, to which the end of the belt is secured by means of a bracket 72 adjacent the ear 45.

When the lever 36 at a collision is thrown backwards the loop portion of the belt suspended by the hose will freely slide through the ears 45 and 71 and due to the selected height level be tightly applied to the hip portion of the passenger as indicated by dot-and-dash lines in FIG. 7. In order that the belt in this case at certain postures of the body during its movement will not be obstructed before it has passed past the knees of the passenger, it is suitable that the belt, as shown in the drawing is from behind suspended on the hose 31 or is otherwise positioned in the path of movement of the hose at the backward movement thereof, and it is also important that the belt has such a length that the belt will reliably be taken along with the hose 31 along the path of movement of the hose over the knees.

With the embodiment according to FIGS. 6 and 7 the same effect is achieved as at the embodiment according to FIGS. 1 and 2, i.e. the body of the passenger cannot at a collision be forced down from the seat, and simultaneously every possibility of injuries of the legs is eliminated.

In the above specification a safety device for passengers in the front seats of a car has been described, but it is obvious that at similar device may be provided also for passengers in the back seat. Also in other respects many different modifications are possible without departing from the scope of the invention.

What I claim is:

1. An automatically releasable safety device for vehicles, comprising: at least one first pressurized gas source, a member for activating said first pressurized gas source, means to activate said member at a violent acceleration, retardation, compressing or twisting of said vehicle, an elongated gas-impervious envelope transversely extending under an instrument panel in said vehicle, means to cause said envelope to perform a controlled backward movement at the activation of said first pressurized gas source from a front position under said instrument panel and rolling over the body of a passenger in said vehicle into a rear position extending between the areas of the outer shoulder and the inner hip portion of the passenger to firmly secure the body to the seat, means to automatically lock said envelope in said rear position, a second pressurized gas source, means to activate said second pressurized gas source after said envelope has been moved in backward direction past the steering wheel of said vehicle, and means to inflate said envelope into a pad of substantially larger volume across the body of the passenger.

2. An automatically releasable safety device as claimed in claim 1 wherein said elongate gas-impervious envelope consists of a gas-impervious hose being pivotally connected at the central area and the ends thereof to elements simultaneously activated by said first pressurized gas source and moveable in backward direction with a controlled movement.

3. An automatically safety device as claimed in claim 2 wherein said hose consists of an inner portion of a gas-permeable material and an outer portion of gas-impervious material.

4. An automatically safety device as claimed in claim 3 wherein said inner portion and said outer portion of said hose are bounded together by means of an adhesive agent prior to the inflation of said hose.

5. An automatically releasable safety device as claimed in claim 1 wherein said gas-tight envelope consists of a gas-imperviously sealed hose being pivotally connected at each opposite end thereof to first and second elements being simultaneously activated by said first pressurized gas source and movable backwards with controlled movement, said first element being mounted approximately in the longitudinal middle plan of said vehicle and said second element being mounted at each side thereof.

6. An automatically releasable safety device as claimed in claim 5 wherein said central element consists of a lever being pivotally mounted on a horizontal transverse shaft below said instrument panel and operable in backward direction by said first pressurized gas source, said lever at top end thereof being provided with an opening in which said envelope is rotary mounted.

7. An automatically releasable safety device as claimed in claim 6 wherein said lever at the bottom end thereof is provided with a ratchet tooth rim cooperating with a ratchet pawl mounted on a stationary element of said car to automatically lock said lever in a rearmost position thereof.

8. An automatically releasable safety device as claimed in claim 5 wherein each of said second side elements consists of a carriage movable in a track on the inside of the vehicle, said envelope being rotary attached to said carriage with one of its ends, said carriage being operable by said first pressurized gas source simultaneously with the operation of said of said central element by said first pressurized gas source.

9. An automatically releasable safety device as claimed in claim 8 wherein said track means is composed of a first section mounted on the door of said vehicle and a second section mounted on the portion of the side wall of the vehicle positioned ahead of said door, and being in flush with said first portion on the inside of said door in the closed condition thereof, said second track portion receiving said carriage before operation thereof by said first pressurized gas source.

10. An automatically releasable safety device as claimed in claim 9 wherein said carriage in said second portion of said track is blocked by means of a latch member operable by said first pressurized gas source.

11. An automatically releasable safety device as claimed in claim 9 wherein said carriage is automatically blocked in said first track section in a rearmost position by means of spring-biased braking pads connected to the carriage by means of links to be automatically urged against the inner sides of said track when the backward movement of said carriage is interrupted.

12. An automatically releasable safety device as claimed in claim 9 wherein said carriage is provided with a pin on which a circular disk is rotary mounted to the periphery of which the end of said envelope is gas-tightly secured.

13. An automatically releasable safety device as claimed in claim 12 wherein said second pressurized gas source is mounted on said disk within said envelope, said pin being provided with an axial bore in which a needle pin is slidable, a cam being provided on the inside of said first track section in the path of movement said needle pin to axially displace said needle pin towards said second pressurized gas source to initiate the same and inflate said envelope when said needle pin is moved past said cam.

14. An automatically releasable safety device as claimed in claim 9 wherein said first track section is open at the rear end thereof.

15. An automatically releasable safety device as claimed in claim 9 wherein said first track section includes at the rear portion thereof a first obliquely upwardly directed track portion and a second obliquely downwardly directed track portion, a vertically adjustable plate being provided between the front section of the track and said track portions, said plate being provided with a third upwardly directed track portion and a fourth downwardly directed track portion, said third track section in a first position of said plate being in flush with the front portion of said track and with said first track portion, and said fourth track portion in a second position of said plate being in flush with the front portion of said track and with said second track portion.

16. An automatically releasable safety device as claimed in claim 5 wherein between each door and the instrument panel is provided a belt extending through an opening in said central element and mounted in a position in which the belt is tightly stretched across the underlegs of the respective passenger at the backward movement of the central element.

17. An automatically releasable safety device as claimed in claim 16 wherein the portion of the belt extending along the front wall of the vehicle extends through the guide opening of the central element and through a guide ear on said front wall, the opposite end of the belt being secured to the central element at a point spaced from said guide opening, the belt having such a length and the attachement points of the ends thereof being at such level, that the belt at the backward movement of the central element is tightly stretched across the hip portion of the respective passenger.

18. An automatically releasable safety device as claimed in claim 17 wherein the portion of the belt extending between the side wall of the vehicle and the central element is positioned in the path of the movement of said envelope.

19. An automatically releasable safety device as claimed in claim 1 wherein said envelope consists of two gas-imperviously sealed hoses pivotally connected at each end thereof to elements which are simultaneously operable by said first pressurized gas source and movable backwards with a controlled movement, one of said elements being positioned approximately in the longitudinal middle plan of said car and the other one being positioned at the respective side thereof.

20. An automatically releasable safety device as claimed in claim 17 wherein said hoses communicate with each other.

21. An automatically releasable safety device as claimed in claim 1 wherein said envelope is coupled to a stationary element of the vehicle in order to be subjected to a rotary movement about its longitudinal axis simultaneously with the backward movement thereof.

22. An automatically releasable safety device as claimed in claim 21 wherein said envelope is connected with a gear wheel engaging a gear rack stationary mounted in the car.

23. An automatically releasable safety device as claimed in claim 21 wherein at least one wire is wound about said envelope at the central area thereof, a first end of said wire being attached to said area of said envelope and a second end of said wire being attached to said stationary element of the car.

24. An automatically releasable safety device as claimed in claim 1 wherein a guide element is provided between said envelope and said steering wheel of the car to guide the envelope past said steering wheel without contacting the same at the backward movement of said envelope.

25. An automatically releasable safety device as claimed in claim 1 wherein the safety device comprises a knee abutment mounted behind and below said envelope to avoid a blocking of the path of movement of the envelope by the knees of the respective passenger.

* * * * *